(12) United States Patent
Souza

(10) Patent No.: US 8,655,988 B2
(45) Date of Patent: Feb. 18, 2014

(54) METHOD AND SYSTEM FOR CONFIGURING NETWORK ACCESS NODES

(75) Inventor: Victor Souza, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 90 days.

(21) Appl. No.: 12/809,442

(22) PCT Filed: Dec. 19, 2007

(86) PCT No.: PCT/SE2007/051035
§ 371 (c)(1),
(2), (4) Date: Jun. 18, 2010

(87) PCT Pub. No.: WO2009/078773
PCT Pub. Date: Jun. 25, 2009

(65) Prior Publication Data
US 2010/0275119 A1    Oct. 28, 2010

(51) Int. Cl.
*G06F 15/16* (2006.01)
(52) U.S. Cl.
USPC ............ 709/220; 370/254; 715/705; 715/733
(58) Field of Classification Search
None
See application file for complete search history.

(56) References Cited

U.S. PATENT DOCUMENTS

| 2005/0041596 A1* | 2/2005 | Yokomitsu et al. ............ 370/252 |
| 2007/0022185 A1* | 1/2007 | Hamilton et al. ............. 709/220 |
| 2007/0113285 A1* | 5/2007 | Flowers et al. ................. 726/23 |

FOREIGN PATENT DOCUMENTS

| EP | 1061431 A2 | 12/2000 |
| GB | 2345166 A | 6/2000 |

* cited by examiner

*Primary Examiner* — Stephen Hong
*Assistant Examiner* — Keith Bloomquist

(57) ABSTRACT

In order to put a network access node such as a wireless router or home gateway in a home network in operation, the node needs to be configured with several parameters requiring technical skills that an ordinary user often does not have. The present invention solves this problem by introducing a system and a method to assist the user to configure the router. The system comprises a web based wizard, an inference engine coupled to said wizard and a knowledge base coupled to said inference engine. The wizard guides the user to provide input which together with stored information retrieved from the knowledge base is processed by the inference engine. The inference engine further generates configuration data that is stored in the wireless router or home gateway. The user can without detailed technical knowledge easily configure the router.

15 Claims, 5 Drawing Sheets

METHOD AND SYSTEM FOR CONFIGURING NETWORK ACCESS NODES

TECHNICAL FIELD OF THE INVENTION

The present invention relates to a method and a system for assisting a user to configure a network access node.

DESCRIPTION OF RELATED ART

The number of personal computers (PCs) and other terminals in each home that have access to the Internet is continuously increasing. Network access nodes (such as wireless routers and home gateways) have become a commodity. A large number of different models of wireless routers for home/residential networks are today available on the market. In a common configuration the network access node performs the following functionalities:

- Bridging at layer 2 terminals coupled to the network access node.
- Routing to the Internet (external public IP).
- Routing in a private network (if more than one subnet is present).
- NAT/NAPT translation.
- Firewall.

Before putting such a network access node into operation, this node has to be configured. This is normally a manual exercise done by the user of the home network. An example on this is given by the user manual for D-Link's wireless router DI-624. A PC is connected to the wireless router via an Ethernet LAN cable. A web browser is started, and a specific IP address for the router (such as http://192.168.0.1) is entered in the address field in the browser. By doing this, web pages in the router can be accessed and the user can configure the router. Similar web interfaces are implemented in network access nodes designed for other environments such as offices, schools, factories etc. An example of that is Cisco Aironet 1200.

SUMMARY OF THE INVENTION

A problem with all the current network access nodes is that their management interfaces are not particularly end-user friendly. The configuration of network access nodes demands a lot of technical details from the end users. This may be overcome by consulting technically skilled persons specialized in doing these configurations. For example in home networks it is normally the user him- or herself that has to do this and often he or she does not have enough technical knowledge in order to configure the network access node in a correct and optimal way. A wrong configuration can result in serious security breaches. A typical example is the configuration of the security features for a wireless router. Overwhelmed by very technical details on encryption keys, authentication etc the user often refrains from using these features and leaves the air interface in the home network open for possible intruders.

Another problem with manual configuration is that it is time consuming and error prone. Applications that worked before the network access node was installed may simple stop working because some parameters were unintentionally changed.

Yet another problem is that a NAT (Network Address Translation) functionality normally included in network access nodes in certain situations requires port mapping tables to be configured manually which again requires network knowledge by the user setting up the home network.

Apart from the network access node itself, it may also be necessary to configure the terminals connected to the access node. A problem with this activity is also that it is time consuming and error prone.

These problems have been solved in the current invention by introducing a system for assisting the user to configure the network access node and optionally also the terminals connected to the access node. The system comprises a web based installation wizard and an inference engine that is coupled to the installation wizard. The system also comprises a knowledge base coupled to the inference engine. The inference engine is further designed to be coupled to at least one configuration memory area in the network access node.

The wizard is designed to guide the user to provide input to the system (such as asking the user a set of questions). The input received from the user is forwarded to the inference engine. The inference engine also retrieves stored information from the knowledge base. The inference engine processes the input from the user together with the stored information, and generates configuration data according to user requirements on the access node that is stored in one or several of the configuration memory areas.

As an option, the system also comprises a port scanner that is coupled to the wizard and designed to identify port forwarding parameters for terminals and servers connected to the network access node. These parameters are stored in a port mapping table in one of the configuration memory areas.

The system is suitable to be implemented in the network access node itself together with the configuration memory areas and a user interface that is connected to the user's terminal.

An advantage with the current invention is that a user quickly and more easily can configure the network access node. Another advantage is that it can be used by users that do not have any deep technical knowledge or experience with such nodes. Yet another advantage is that fewer errors are made, errors that normally lead the user to confront even more difficulties in order to restore the configuration to a desired status.

The objective with the current invention is therefore to allow also users that are not technical experts in network access nodes to quickly and easy configure these nodes so they can be put in operation.

The invention will now be described in more detail and with preferred embodiments and referring to accompanying drawings.

DETAILED DESCRIPTION OF EMBODIMENTS

Figure 1:
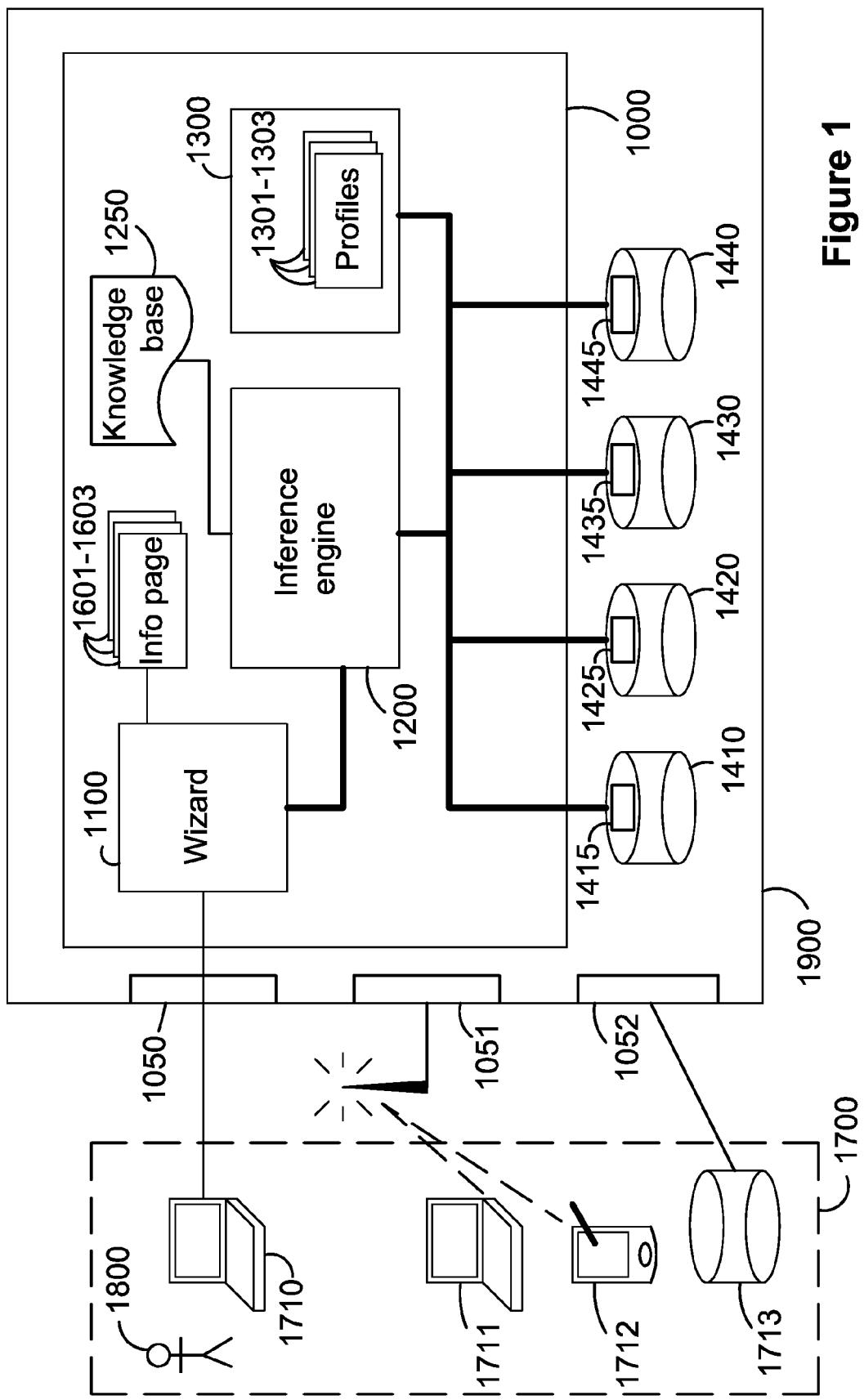
FIG. 1 is a block diagram showing the system according to the present invention.

FIG. 1 is a block diagram showing an embodiment of the current invention, a system 1000 implemented in a network access node 1900 such as a wireless router. The system 1000 comprises a web based installation wizard 1100 that is coupled to a private network interface 1050 in the router 1900. This network interface 1050 (often an Ethernet LAN interface) is accessed by a user 1800 using a PC or a laptop 1710. The installation wizard 1100 is further coupled to an inference engine 1200 and a memory area 1300 comprising pre-defined configuration profiles 1301-1303. The inference engine 1200 is also coupled to a knowledge base 1250 and at least one configuration memory area 1410,1420,1430,1440 in the wireless router 1900 where respectively configuration data 1415, 1425, 1435, 1445 is stored.

Apart from the interface 1050, the access node 1900 is also equipped with two additional private interfaces 1051, 1052. The interface 1051, which is a wireless interface (typically using any of the IEEE 802.11 WLAN protocols) is accessed from two wireless terminals a laptop 1711 and a PDA 1712. Interface 1052 is a wired interface that is connected via an Ethernet cable to a home server 1713. All terminals 1710-1712 and the home server 1713 belong to a single home network 1700. The home server 1713 is among all designed to act as common data storage for the other terminals 1710-1712 in the home network 1700. The terminals 1710-1712 and the home server 1713 are here also commonly called hosts.

In the system 1000 the wizard 1100 is designed to guide the user 1800 to provide input in a natural language (no specific technical knowledge from the user 1800 is required). The input received from the user 1800 is forwarded to the inference engine 1200.

Inference engines and knowledge bases normally comprise computer implemented software and are mostly used in expert systems that originally were conceived for AI, Artificial Intelligence systems.

The inference engine 1200 in the current invention is designed to derive conclusions from the input from the user 1800 and the stored information in the knowledge base 1250 in order to generate configuration data 1415, 1425, 1435, 1445 which is stored in the configuration memory areas 1410, 1420, 1430, 1440 in the network access node 1900. Configuration data 1415, 1425, 1435, 1445 can be related to policies, traffic shaping, security and other communication parameters (such as port forwarding parameters and firewall parameters) respectively. Examples on port forwarding parameters are the port numbers of internal and external ports and the internal IP addresses to the hosts 1710-1713.

The installation wizard 1100 and the inference engine 1200 are not only designed to cover the configuration of the access node 1900 but do also have the option to support the configuration of the hosts 1711-1713 connected to the access node 1900. After all the needed information is obtained by the installation wizard 1100 in order to configure the network access node 1900, the wizard 1100 is designed to guide the user 1800 to configure also the hosts 1711-1713.

The installation wizard 1100 is further designed with an optional feature to present implications and details relating to inputs made by said user 1800. The feature can be turned on or off. The implications are presented to the user 1800 by linking to info pages (such as web pages) 1601-1603 in the system 1000 comprising descriptions of said implications. For example, if the user 1800 selects the high level option of using strong security, this implies that WPA (Wi-Fi Protected Access) is used, whilst if light security is selected this implies that WEP (Wired Equivalent Privacy) is used. Other examples could be to explain which features works with which operating system (Windows, Unix etc).

As another option, the system 1000 can be provided with a profile memory area 1300 comprising at least one pre-defined configuration profile 1301-1303. A pre-defined profile 1301 can have network topologies and characteristics that are commonly found in, for example, home networks or networks of small offices. If the user 1800 decides not to use the wizard, he has the option to select one of the pre-defined configuration profiles 1301-1303 stored in the profile memory area 1300 instead. If one of these profiles 1301-1303 is selected, the selected profile is stored in the configuration memory areas 1410, 1420, 1430, 1440. Pre-defined profiles 1301-1303 are used for common configurations, e.g., for one wireless laptop 1711 and one wired desktop (not shown in FIG. 1) connected to the network access node 1900. By selecting one profile 1301, all the configuration of the network access node 1900 is performed.

Figure 2:
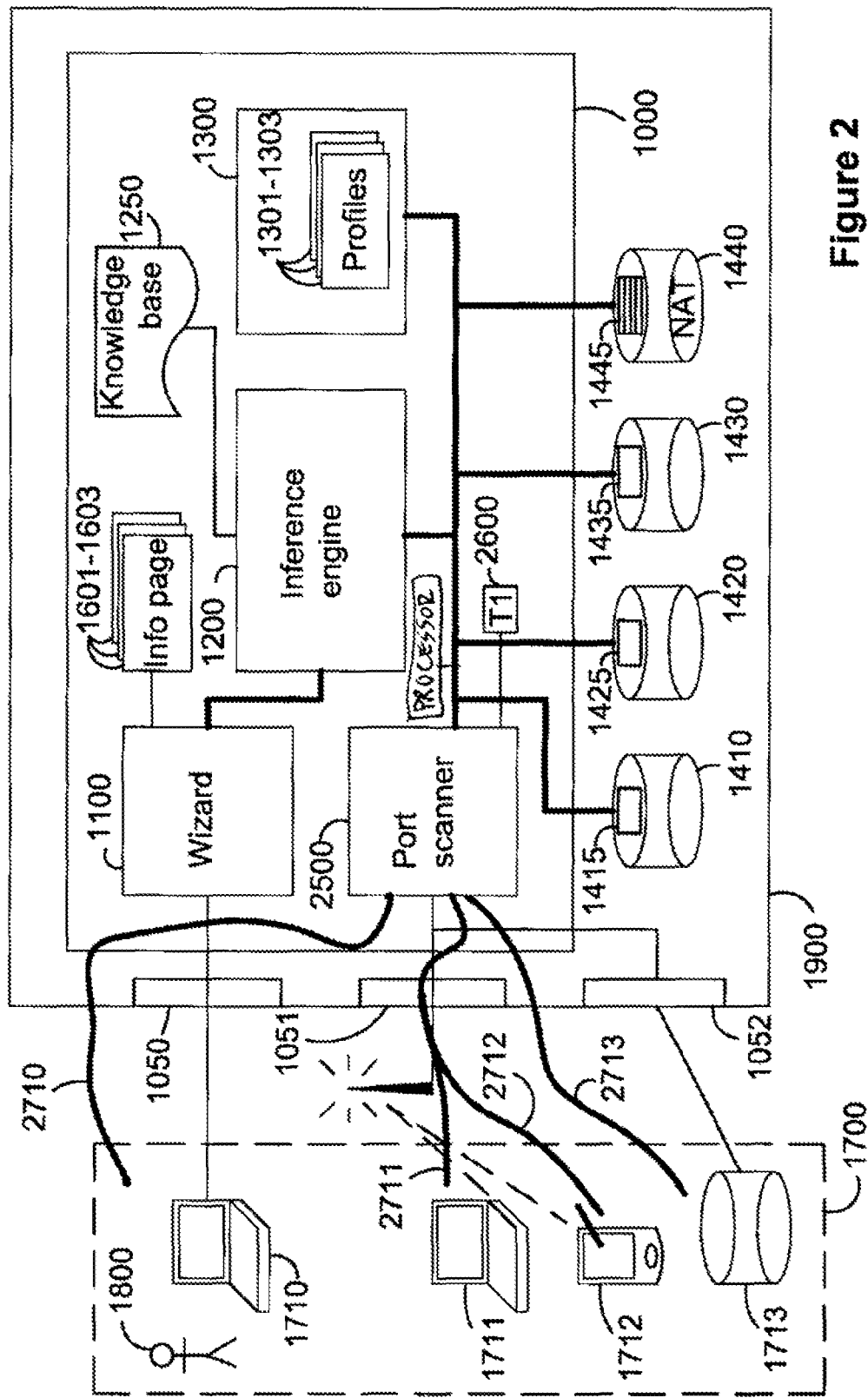
FIG. 2 is a block diagram showing the system according to the present invention but also comprising a port scanner.

FIG. 2 is a block diagram showing a second embodiment of the current invention. This embodiment includes all components from the first embodiment in FIG. 1 but with the addition of a port scanner 2500. The port scanner 2500 is designed to be coupled and used together with the wizard 1100, but can also be used separately. The port scanner 2500 is further designed to be triggered by the wizard 1100 to send scanning messages (e.g. a TCP SYN message) 2710-2713 towards all ports in each host 1710-1713. From the response messages, the port scanner 2500 determines which ports are in an open state (listening mode or LISTEN state as defined in RFC793). The port number for each open internal port is stored together with the IP addresses of the hosts 1710-1713 as configuration data 1445 in the configuration memory area 1440. In this embodiment the configuration memory area 1440 equals a Network Address Translation entity (NAT) and the configuration data 1445 equals a port mapping table in the NAT 1440. For each open internal port, the system 1000 also creates an instance of an external port having the same port number as the open internal port. The port number for this external port is also stored in the port mapping table 1445. This port mapping table 1445 is designed to facilitate incoming connections to be established from the public network (not shown in FIG. 1 or 2) to any of the hosts 1710-1713 in the private network 1700.

Apart from being triggered by the wizard 1100, the port scanner can optionally be triggered at regular intervals by using a timer T1 2600 in the system 1000.

Figure 3:
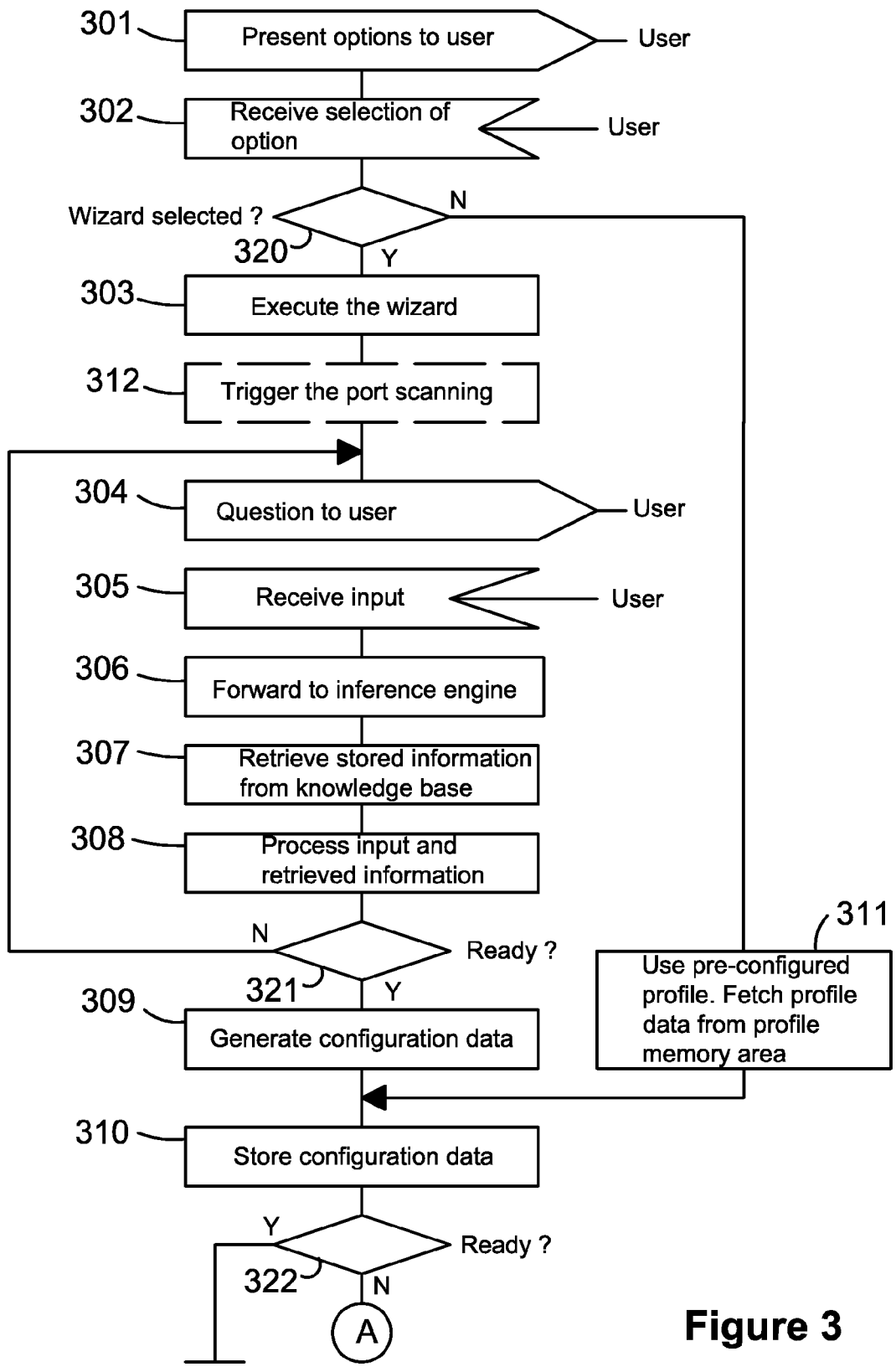
FIG. 3 is a flow chart illustrating the method to configure a network access node according to the current invention.

The flowchart in FIG. 3 describes the steps for configuring the access node 1900. The user 1800 has an option in step 301 to select any of the pre-configured profiles 1301-1303 or to seek support from the installation wizard 1100. The system 1000 receives in step 302 the selection from the user 1800. If a pre-configured profile 1301-1303 is chosen, step 320, this profile 1301-1303 is fetched in step 311 from the profile memory area 1300 and directly stored in step 310 in the configuration data 1415,1425,1435,1445 in the configuration memory areas 1410, 1420, 1430, 1440. If the user 1800 selects to use the wizard 1100, the wizard 1100 is executed in step 303. Optionally in step 312, also the port scanner 2500 is triggered in order to determine the port forwarding parameters for each host 1710-1713. More details on step 312 are described further below accompanied by FIG. 5. Staying with FIG. 3, the wizard 1100 presents in step 304 questions to the user 1800. The user 1800 provides input to the wizard 1100 in step 305 which are forwarded to the inference engine 1200 in step 306. The inference engine 1200 further retrieves in step 307 stored information from the knowledge base 1250. The input from the user 1800 and the retrieved information from the knowledge base 1250 are processed by the inference engine 1200 in step 308. If more input in step 321 is needed from the user 1800, the wizard 1100 is going back to step 304 and asks further questions. If enough input is received from the user 1800, the inference engine 1200 generates new configuration data in step 309 which are stored in step 310 in the configuration data 1415,1425,1435,1445 in the configuration memory areas 1410, 1420, 1430, 1440.

As said above, the installation wizard 1100 is not only designed to guide the user 1800 to configure the access node 1900 but does also have the option to support the user 1800 to configure each of the hosts 1711-1713 connected to the access node 1900.

Figure 4:
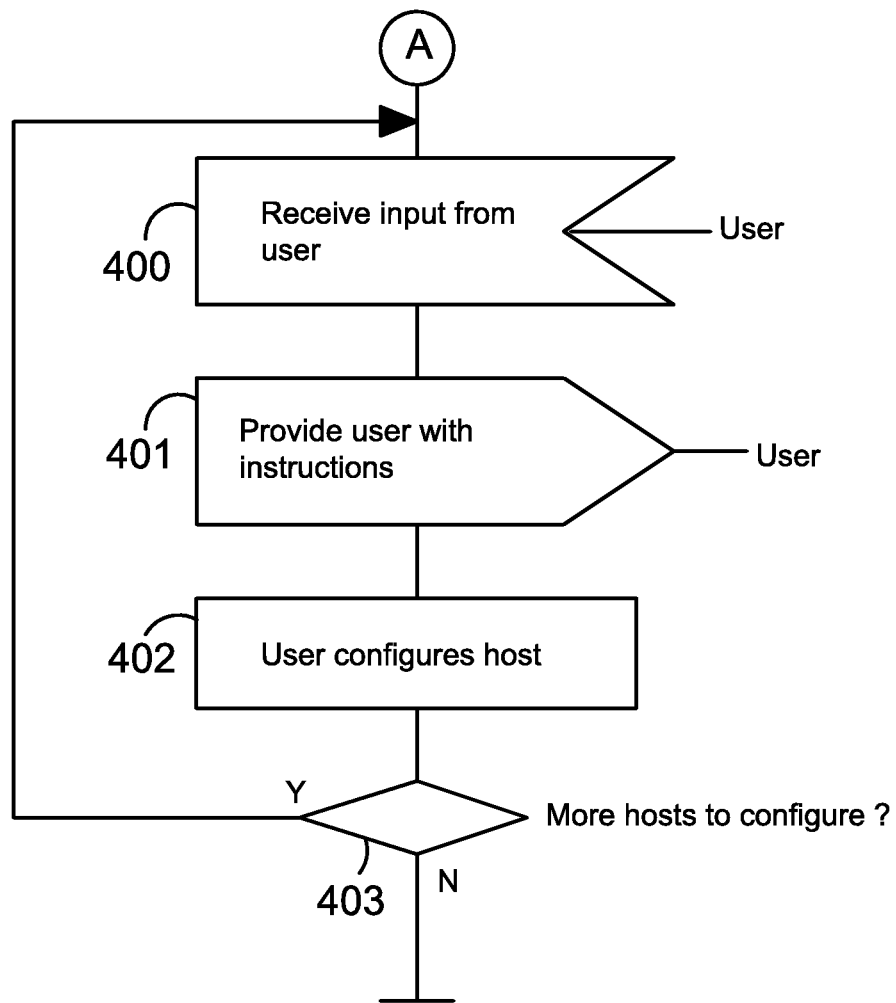
FIG. 4 is a flow chart illustrating the method to configure each terminal or server connected to the access node using the current invention.

FIG. 4 describes the work flow for such a configuration which can be selected in step 322 as an optional continuation (A) of the flow chart in FIG. 3. The user 1800 normally needs to provide additional input in step 400 so that the inference engine 1200 can guide him/her through the configuration. The additional input comprises host specific information, e.g., the configuration of a Linux host is different from a Windows host. All the information provided through the iteration of step 305 is also used to determine the configuration of the hosts 1711-1713. The user 1800 gives input to the wizard 1100 in step 400 and receives instructions in step 401 on how to configure one of the hosts 1711-1713. The user 1800 configures this host 1711-1713 in step 402. The configuration is performed in a step-by-step manner. For example, if strong security was previously chosen (step 305), the wizard 1100 will guide the user 1800 to configure the connected host 1711-1713 by supplying encryption keys, Service Set Identifier (SSID) and other parameters. If more hosts 1711-1713 are to be configured a repetition of steps 400-402 can be selected for each host 1711-1713 in step 403.

Figure 5:
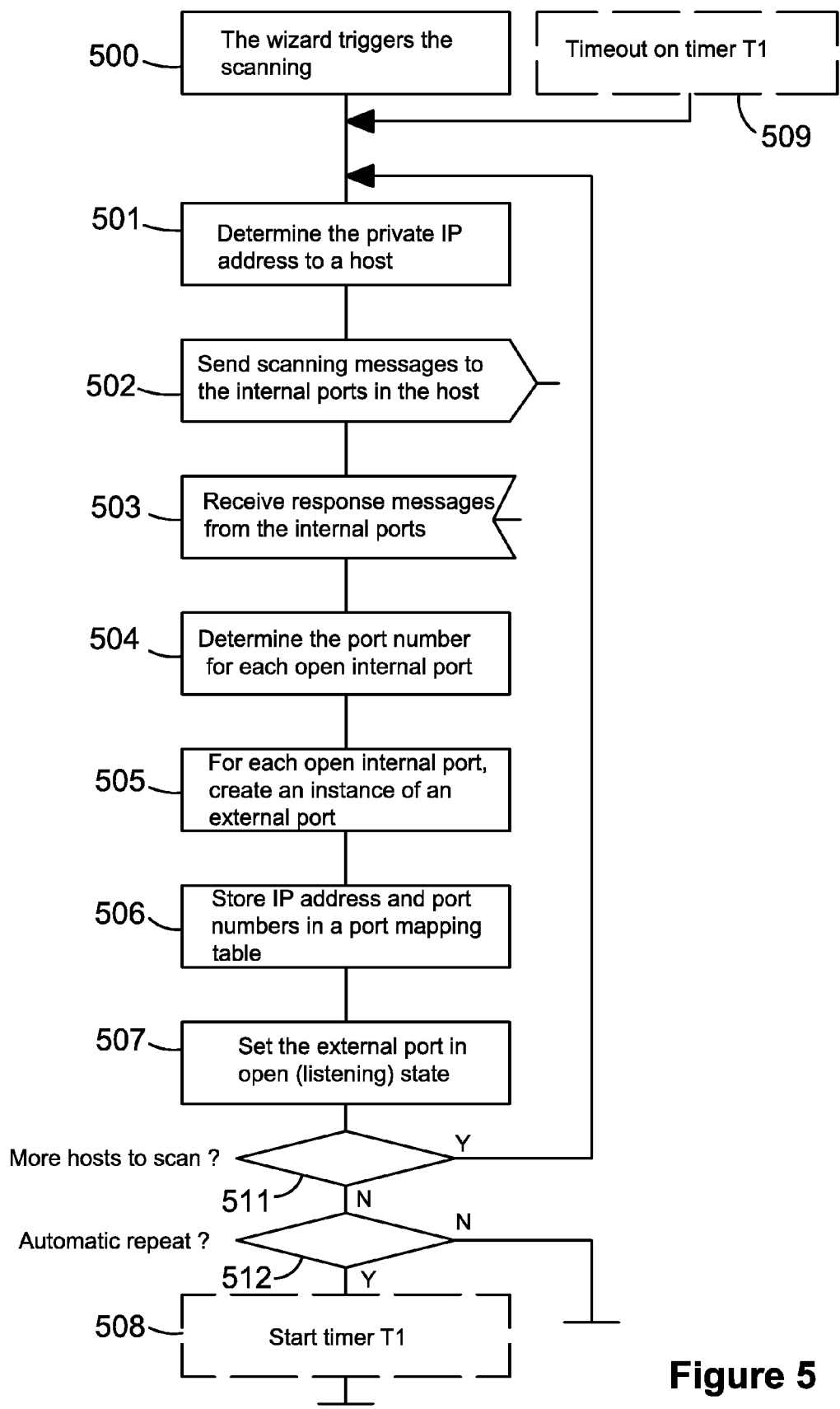
FIG. 5 is a flow chart illustrating the method to configure a network access node with port forwarding parameters using a port scanner.

FIG. 5 is a flow diagram expanding the optional step 312 in the flow chart in FIG. 3 and is illustrating a scanning process to determine the port forwarding parameters for each host 1710-1713. If the wizard 1100 triggers the scanning process this is done in step 500. In step 501, the private IP address to a first host 1710 is determined. The IP addresses to the hosts 1710-1713 in the private network 1700 are determined by looking in a configuration memory area 1410 in the network access node 1900. In step 502, the port scanner 2500 sends scanning messages 2710 to the internal ports in the host 1710. Response messages from the internal ports are received in step 503. In step 504 the internal port number for each open port is determined and for each internal port number, an instance of an external port number is created in step 505. The port number of the external port is set to the same port number as the internal port. The port numbers for the internal and the external ports are in step 506 stored together with the private IP address of the host 1710 in the port mapping table 1445. Finally, to allow incoming connections, the each external port is put in an open state in step 507.

If more hosts 1710-1713 remain to be scanned in step 511 the sequence 501-507 is repeated for each of those hosts 1710-1713. If the option to have the scanning process automatically repeated at regular intervals is selected in step 512, the timer T1 2600 is started in the optional step 508. When timer T1 2600 times out in step 509, the steps 501-507 are repeated again as described above.

Guided by the wizard 1100, the user 1800 can also prepare the hosts 1710-1713 by starting additional applications not yet started, applications that can be expected to be accessed from the public network. By starting the applications, the internal port for that application is put in an open state. Again, after using the scanning process described above, the port mapping table 1445 is automatically configured with the port forwarding parameters.

Although the described embodiments of the invention primarily are addressing home/residential networks the method and the system can also be implemented in other network access nodes designed for other environments such as offices, schools, factories etc.

The invention claimed is:

1. A system for assisting a user in configuring a network access node, the system comprising:
   a web based installation wizard;
   a processor;
   an inference engine coupled to the installation wizard and the processor and designed to be coupled to at least one configuration memory area;
   a port scanner coupled with the processor that is triggered by the installation wizard and is designed to scan internal ports in end user computing devices connected to the network access node and to determine the port number of each internal port that is in open state and to create for each open internal port an instance of an external port having the same port number as the open internal port and to store in one of the configuration memory areas private IP addresses to the end user computing devices together with the port numbers of each open internal port and each external port;
   a knowledge base coupled to the inference engine and the processor, wherein said wizard is for guiding the user to provide input to the system; and
   said inference engine is configured:
      for receiving said input,
      to retrieve stored information from the knowledge base,
      to process said input and stored information and
      to generate and store configuration data according to user requirements on the system in said at least one configuration memory area; and
      the wizard and the inference engine supporting the user to configure end user computing devices, including security level, connected to network access node from the information in the knowledge base through the processor.

2. The system in claim 1 where the wizard is coupled to a user interface.

3. The system in claim 2 where the wizard receives input in a natural language not requiring any specific technical knowledge by the user.

4. The system in claim 1 further comprising a profile memory area coupled to the wizard where said memory area comprises at least one selectable pre-defined configuration profile.

5. The system in claim 4 where the wizard comprises means for storing the pre-defined configuration profile that has been selected by the user in said at least one configuration memory area.

6. The system in claim 1 where the wizard presents implications to the user of inputs made by said user.

7. The system in claim 6 where the wizard is linked to a web page comprising descriptions of said implications.

8. A network access node comprising:
   at least one private interface;
   at least one configuration database; and
   a system for assisting a user in configuring the network access node, the system comprising:
      a web based installation wizard;
      a processor;
      an inference engine coupled to the installation wizard and the processor and designed to be coupled to at least one configuration memory area;
      a port scanner coupled to the processor that is triggered by the installation wizard and is designed to scan internal ports in end user computing devices connected to the network access node and to determine the port number of each internal port that is in open state and to create for each open internal port an instance of an external port having the same port number as the open internal port and to store in one of the configuration memory areas private IP addresses to the end user computing devices together with the port numbers of each open internal port and each external port;

a knowledge base coupled to the inference engine and the processor, wherein said wizard is for guiding the user to provide input to the system; and for receiving said input, to retrieve stored information from the knowledge base, to process said input and stored information and to generate and store configuration data according to user requirements on the system in said at least one configuration memory area; and the wizard and the inference engine supporting the user to configure end user computing devices, including security level, connected to network access node from the information in the knowledge base through the processor.

9. The network access node as in claim 8 where the wizard is coupled to a user interface.

10. The network access node in claim 8 where the wizard receives input in a natural language not requiring any specific technical knowledge by the user.

11. The network access node in claim 8 further comprising a profile memory area coupled to the wizard where said memory area comprises at least one selectable pre-defined configuration profile.

12. The network access node in claim 11 where the wizard comprises means for storing the pre-defined configuration profile that has been selected by the user in said at least one configuration memory area.

13. The network access node in claim 8 where the wizard presents implications to the user of inputs made by said user.

14. The network access node in claim 13 where the wizard is linked to a web page comprising descriptions of said implications.

15. A method for assisting a user in configuring a network access node, the method comprising the following steps:

executing a web based installation wizard with a processor;

triggering a port scanner with the wizard;

determining a private IP address to a end user computing device connected to the network access node with the processor;

sending a scanning message towards at least one internal port in the end user computing device;

receiving a response message from the at least one internal port;

determining the port number of each internal port that is in an open state with the port scanner coupled to the processor;

for each internal port that is in an open state, creating an instance of an external port having the same port number as the internal port with the processor;

storing in a configuration memory area the private IP address to the end user computing device together with the port numbers of each open internal port and each external port;

setting each external port in an open state with the processor;

presenting a question to the user with the processor;

receiving input from the user;

forwarding the input to an inference engine;

retrieving stored information from a knowledge base;

processing said input and stored information in the inference engine with the processor;

generating configuration data; and storing said configuration data in at least one configuration memory area in the network access node; and the wizard and the inference engine supporting the user to configure the end user computing devices, including security level, connected to network access node from the information in the knowledge base through the processor.

* * * * *